United States Patent
Eberle (10) Patent No.: US 8,355,408 B2
(45) Date of Patent: Jan. 15, 2013

(54) SYSTEM WITH DISTRIBUTED ANALOGUE RESOURCES

(75) Inventor: Wolfgang Eberle, Leuven (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 12/067,795

(22) PCT Filed: Sep. 21, 2006

(86) PCT No.: PCT/BE2006/000102
§ 371 (c)(1),
(2), (4) Date: Aug. 28, 2008

(87) PCT Pub. No.: WO2007/033442
PCT Pub. Date: Mar. 29, 2007

(65) Prior Publication Data
US 2009/0016340 A1    Jan. 15, 2009

Related U.S. Application Data

(60) Provisional application No. 60/719,027, filed on Sep. 21, 2005.

(30) Foreign Application Priority Data

Mar. 30, 2006 (EP) ..................................... 06447045

(51) Int. Cl.
*H04L 12/28* (2006.01)
(52) U.S. Cl. ........................ 370/403; 370/258; 370/389
(58) Field of Classification Search .......... 370/230–253, 370/406, 219, 222, 228; 709/203, 208
See application file for complete search history.

(56) References Cited

U.S. PATENT DOCUMENTS

| 5,467,351 | A | 11/1995 | Baumert |
| 5,699,356 | A | 12/1997 | Beever et al. |
| 6,343,331 | B1 | 1/2002 | Stirling |
| 6,633,538 | B1 * | 10/2003 | Tanaka et al. ................. 370/222 |
| 6,956,826 | B1 * | 10/2005 | Binder .......................... 370/254 |
| 2002/0034184 | A1 | 3/2002 | Du |

(Continued)

FOREIGN PATENT DOCUMENTS

EP    1351403    10/2003
(Continued)

OTHER PUBLICATIONS

International Preliminary Report on Patentability in PCT/BE2006/000102 (Jan. 25, 2008).

(Continued)

*Primary Examiner* — Ricky Ngo
*Assistant Examiner* — Iqbal Zaidi
(74) *Attorney, Agent, or Firm* — McDonnell Boehnen Hulbert & Berghoff LLP (57) ABSTRACT

The present disclosure relates to a system comprising at least a first and a second essentially analogue portion and an essentially digital portion, the analogue portions forming a part of a unidirectional circular network. First communication means is provided between the digital portion and the first analogue portion. Second communication means is provided between the first and second analogue portions. The first and second communication means are configurable for establishing communication between the digital portion and the second analogue portion. The first and second communication means are arranged to determine if a packet communicated over the first or second communication means is of interest for any of the analogue portions.

22 Claims, 4 Drawing Sheets

U.S. PATENT DOCUMENTS

2003/0185229 A1  10/2003  Shachar
2003/0189940 A1* 10/2003  Greenblat .................. 370/406
2005/0088982 A1   4/2005  Ying

FOREIGN PATENT DOCUMENTS

WO        9945728 A2    9/1999
WO     2005053223 A2    6/2005

OTHER PUBLICATIONS

International Search Report in PCT/BE2006/000102 (Feb. 12, 2007).
Written Opinion of the International Searching Authority in PCT/BE2006/000102 (.

* cited by examiner

SYSTEM WITH DISTRIBUTED ANALOGUE RESOURCES

FIELD

The present invention relates to a system comprising at least two analogue network parts and a digital network part. It also relates to a method for controlling and managing such a system.

BACKGROUND

An increasing number of consumer devices are equipped with wireless interfaces. The number of different wireless interfaces in a single device is rising. Cost pressure requires the implementation of multiple wireless standards e.g. in a single package or on a single chip. Analogue/RF front-end designers aim at software-reconfigurable (SRR) or software-defined radios (SDR), which share a significant amount of front-end building blocks. When shared, however, these blocks have to be adjustable and/or programmable, hence the amount of control signals increases. In addition, the usage of more advanced technology (130-nm, 90-nm, etc.) degrades the reliability of the manufactured designs. To avoid too large design margins (and the accompanying cost), digital compensation techniques are required to compensate for the analogue imperfections. Again, these techniques require more programmability and observability of the front-end; also here, more control pins (control and monitoring) are required.

Flexible front-end designs feature an increasing amount of control pins. Single standard front-ends may face more control pins since digital compensation techniques will be used. For multiple standard front-ends, flexibility requires an increase of control facilities. As a consequence, the amount of control pins is tremendously increasing.

Since current front-end designs still exhibit only a moderate amount of functionality to monitor and steer, state-of-the-art solutions for interconnect schemes essentially rely on point-to-point or bus-based topologies and plain digital solutions. These approaches however have significant disadvantages in the context of analogue/RF designs.

Point-to-point topologies essentially scale linearly with at least the number of control points in the analogue design. When implemented digitally, they also scale linearly with the number of control bits per control point. This introduces a significant routing overhead and design and verification cost. Three major issues arise with current state-of-the-art solutions.

The first issue relates to point-to-point routing of the control pins to each analogue block on the chip. The main disadvantage of such approach is missing scalability. Adding control bits requires a change in the floorplanning, routing, connections per module, and possibly even in the I/O pads of the chip.

Secondly, digital Network-on-Chip (NoC) solutions (layer 3) are too complicated. Digital bus solutions (layer 2) usually require parallel busses and do not take into account crosstalk requirements on analogue/RF chips. Bus-based solutions come with a large overhead in routing area and control logic. Moreover, parallel busses have a higher cross-talk potential and are harder to shield than a single bit line. Moreover, bus protocols are not necessarily made for the specific requirements in a front-end context (slow vs. fast, short vs. long instruction words, broadcast/multi-cast to different receiving nodes).

Thirdly, the usage of plain digital signalling may be considered. A better choice is the usage of e.g. differential and low-voltage signalling (e.g. Low Voltage Differential Signalling (LVDS)).

Hence, flexible front-ends are important in the context of reactive, software-reconfigurable, software-defined or cognitive radios. A particularly useful feature is controllability and observability of all front-end resources in order to guarantee reliable, energy-efficient, and quality-aware operation.

Patent application EP1351403-A2 relates to a transceiver with front-end reconfiguration. The described interconnect scheme facilitates the access of an essentially digital controller to the resources on an analogue/RF chip for both steering and monitoring purposes.

The present disclosure aims to provide a front-end design with improved controllability and observability capabilities.

SUMMARY

The present disclosure relates to a system comprising at least a first and a second essentially analogue portion and an essentially digital portion. The first and second analogue portions form a part of a unidirectional circular network. The system further comprises
  first communication means provided between the digital portion and the first analogue portion,
  second communication means provided between the at least first and second analogue portions,
wherein the first and second communication means are configurable for establishing communication between the digital portion and the second analogue portion, and wherein the first and second communication means are arranged to determine if a packet communicated over the first or second communication means is of interest for any of the analogue portions.

In a preferred embodiment each of the first and the second communication means comprises interface circuitry for each circuit connected by the communication means.

In a specific embodiment the analogue portions and the second communication means are on one chip. Alternatively, they are implemented in a single integrated circuit or in a single package.

Preferably the first and second communication means are digital.

Advantageously the system is arranged for providing an information flow for controlling and monitoring the analogue portions guided by the first and second communication means. The analogue portions are preferably part of analogue RF front ends.

In a preferred embodiment the parameters for communication over the first and second communication means are selectable such that interference of the RF functionality is minimised. The parameters for communication are preferably selected from the group of parameters comprising frequency, signal amplitude, packet length, and packet format.

In another preferred embodiment the digital portion is a part of a baseband processor. Advantageously the baseband processor is implemented in the same integrated circuit as the rest of the system. Alternatively the baseband processor is implemented in the same package as the rest of the system.

In an advantageous embodiment the digital portion is provided with a Quality of Experience manager.

Preferably the communication over the first and the second communication means is differential. The first and second communication means are advantageously arranged for low voltage differential signalling.

In another preferred embodiment the communication on the first or the second communication means is unidirectional. The communication advantageously is one-bit communication.

In a specific embodiment the length of the packets is adaptable to at least two speeds of communication.

In a further embodiment the system further comprises a plurality of additional analogue portions arranged for forming together the first and the second analogue portion the unidirectional circular network.

The present disclosure also relates to a system comprising a first subsystem being a system as previously described, a second subsystem also being a system as described and an additional digital portion for connecting the first and the second subsystem.

In another aspect the disclosure relates to a method for controlling an information flow in a system as previously described, comprising the steps of
  receiving configuration information for at least one of the analogue portions,
  arranging the configuration information in the digital portion, and
  transmitting the arranged configuration information over the unidirectional circular network.

Preferably the configuration information comprises packet format information.

In a further aspect the disclosure relates to a method for managing a system as previously described, comprising the steps of
  transmitting with the digital portion over the unidirectional circular network a request for status information of at least one of the analogue portions,
  receiving the request with the at least one analogue portion,
  providing to the digital portion the status information.

The digital portion is preferably provided with a Quality of Experience manager. In a specific aspect the disclosure relates to the use of this method for Quality-of-Experience management.

DETAILED DESCRIPTION

The present disclosure relates to a RF, analogue or mixed-signal communications front-end system with an essentially digital interconnect scheme that links a distributed set of analogue/RF resources (that altogether may form a transceiver solution) to a digital control unit for steering and monitoring purposes. It establishes essentially a second interconnect for control and management purposes besides the typically analogue or mixed-signal data path.

Figure 1:
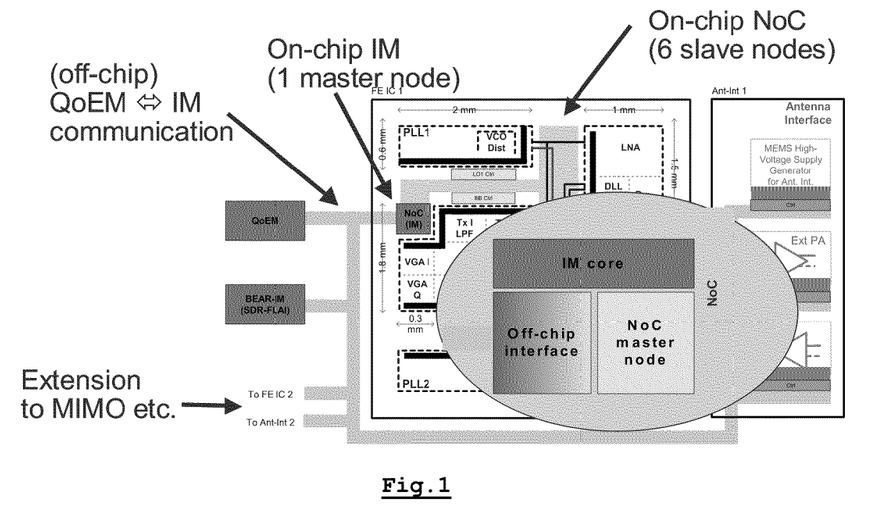
FIG. 1 illustrates a digitally-controlled analogue/RF chip.

The proposed solution describes a complete architecture of a simple-to-implement and scalable network-on-chip specifically designed for integration on analogue/RF chips (see FIG. 1). Details of this architecture and its implementation are described below. The solution extends to an off-chip network that is implemented in the same way. In this case, a bridge functionality is used to connect the two independent networks (on-chip, off-chip). Also a splitting of the on-chip network into several network segments is possible. In this case, network segments are connected by bridges, too.

The generic architecture concept introduces an implementation manager and a network on the analogue chip. The network takes care of exchanging information between the implementation manager and preferably at least two distributed analogue/RF blocks on the chip. The architecture concept comprises an on- and off-chip communication network, the logical packet-based communication scheme and the node architectures, whereby distinction is made between master nodes and slave nodes.

Single Network Segment

Figure 2:
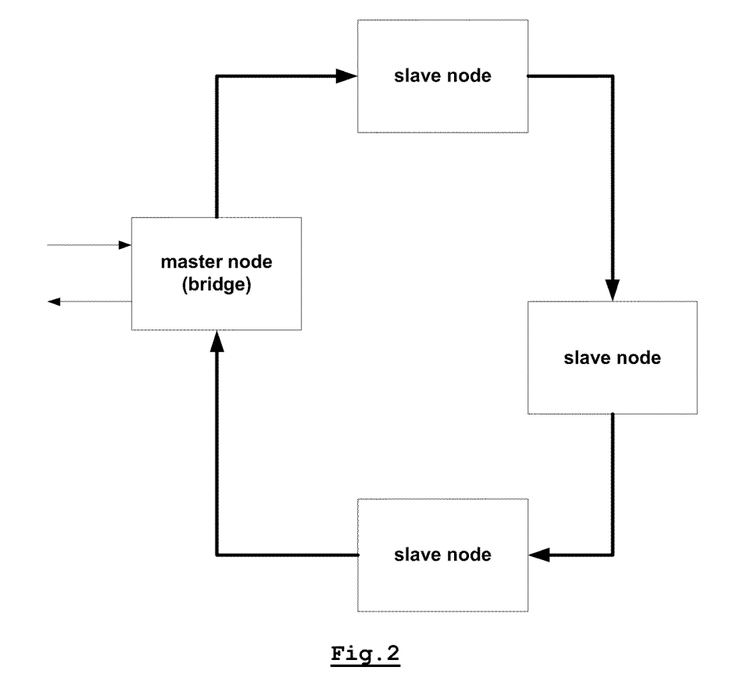
FIG. 2 illustrates a network segment with a closed ring structure and bridge to connect to a second segment.

Important for a single network segment is the closed ring structure (see FIG. 2). The use of this structure allows eliminating layer 3 networking complexity. Moreover, the usage of a distinct send/receive end allows a strict split of the medium.

Information travels unidirectionally. The closed ring structure allows each node to be reachable by every other node. The main mode is however that the bridge initiates communication. Hence, the ring is logically broken at the bridge. As used herein, the term 'bridge' refers to a kind of 'master node.' Slave nodes are also referred to as nodes. The master node determines the main signalling format and is used—if needed—to provide clocking. The master node is also the only connection to another network segment or to an off-chip network.

Principle of Operation

A communication network architecture is proposed based on a ring topology (unidirectional circular topology). The network can be subdivided into segments that are linked with each other through bridges. Communication in a single segment is unidirectional. The ring topology allows the bridge to pass information to the node as well as to receive information from a node reusing the same path.

The use of the closed ring structure allows eliminating layer 3 networking complexity. Moreover, the usage of a distinct send/receive end (see node description below) allows a strict split of the medium.

Information travels unidirectionally. The closed ring structure allows each node to be reachable by every other node. The main mode is however that the bridge initiates communication. Hence, the ring is logically broken at the bridge.

The master node determines the main signalling format and can be used to provide clocking if necessary. The master node is preferably the only connection to another network segment or an off-chip network.

Extension to Multiple Network Segments

Figure 3:
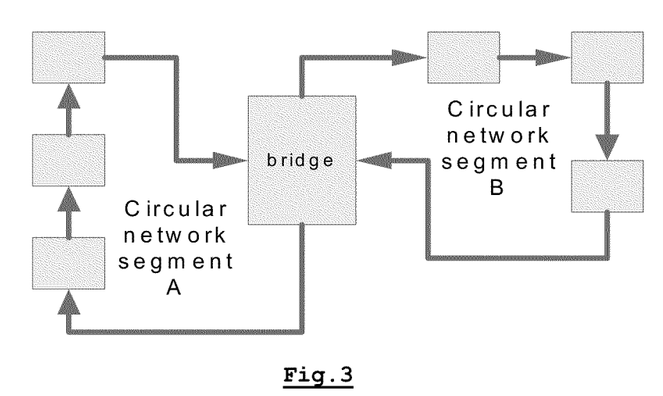
FIG. 3 illustrates a combination of multiple single network segments.
Figure 4:
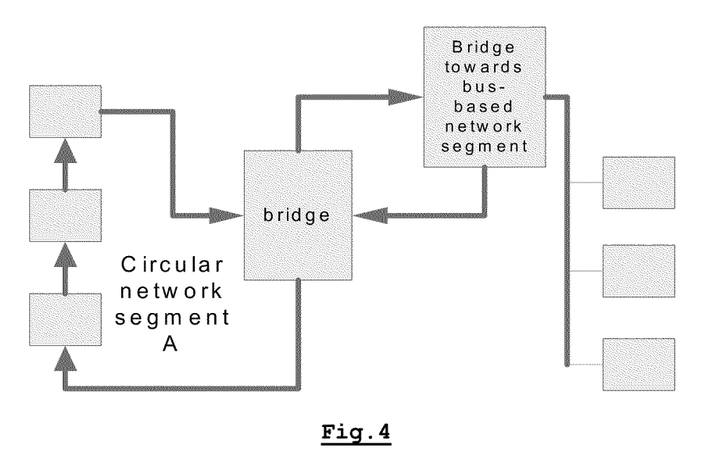
FIG. 4 illustrates an alternative combination of multiple single network segments.

A network comprising multiple instantiations of the single network segment architecture and additional bridging functionality linking them is a straightforward extension of the ring topology (FIG. 3). In this case, bridge functionality is used to connect the two independent networks (on-chip, off-chip). Also a splitting of the on-chip network into several network segments is possible. Also in this case, the various network segments are connected by bridges (FIG. 4).

A first application is when placing multiple front-end chains on the same chip. A second application concerns the link between an on-chip network and an off-chip network. In this case, the bridge connects the chip to the printed circuit board.

A single network-segment based on a ring topology can also hook up through a bridge with a classical network segment, e.g. a bus or a point-to-multipoint segment. This does not require any modification of the single circular network segment architecture.

Considerations Concerning the Physical Interconnect

Interconnection between the nodes can use all physical communication schemes known in the communications domain. In particular, but not limited thereto, reference is made to bus-based parallel communication and serial communication.

Particularly for analogue/RF transmission, it is important to use analogue-friendly signalling over the connections between the nodes (e.g. low crosstalk).

A serial communication scheme is particularly interesting, since it does not require topology changes if the amount of payload changes (e.g. no increase of the bus width). Instead, higher throughput translates into higher clock frequency or more frequent packet transmission. Hence, one can advantageously opt for a serial communication scheme.

An investigation of the required communication throughput and latency for typical analogue/RF transceiver control reveals that a clock frequency of about 120 MHz is sufficient for IEEE 802.11-compliant WLAN designs. This is a moderately low frequency that allows low-cost implementation. Together with the possibility of easily adjusting this frequency in the same range, it prevents creation of disturbing spurs for the analogue/RF data path. This feature is of importance in this context but is not significant in a purely digital context.

Differential signalling on-chip is used. On-board, this is a standard technique both for analogue design and high-speed digital design. However, it is normally not used for busses and the like. The advantage is a balanced cross-talk signal that compensates itself. Moreover, lower digital signal levels are used. That is, in particular, the usage of low voltage differential signalling (LVDS) on-chip is preferable. LVDS is normally used off-chip on boards. LVDS is a mixed-signal solution working with small voltage signals (and differential); this means, for example, 300-400 mV instead of e.g. 1.2V for a 130-nm technology. Driver and receiver have built-in DC offset compensation to allow resistance against drifts.

A further advantage of LVDS is low power consumption due to the low voltage signals and current mode operation. The difference between LVDS off-chip and on-chip is that one can design for much lower capacitance drive on-chip. Hence, only existing LVDS solutions have to be resized, which keeps the approach cost effective. The resized version uses even less power than the off-chip version.

Regarding node architecture and functionality, a distinction is made between two types of nodes: master nodes and slave nodes.

Architecture of a Master Node

Figure 5:
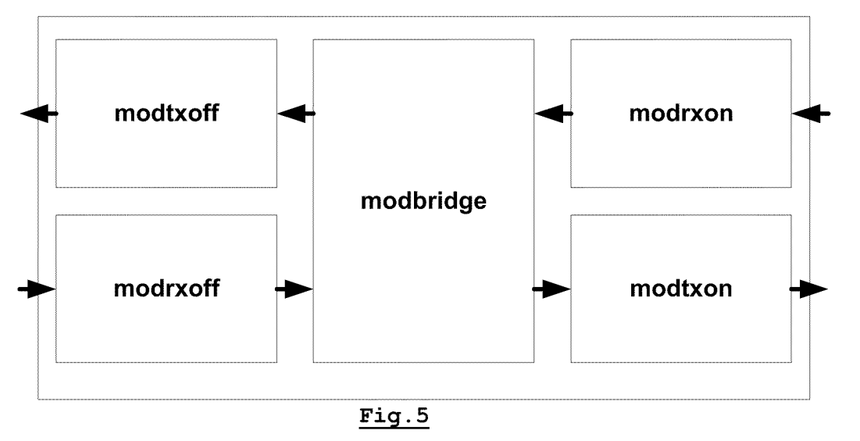
FIG. 5 illustrates an architecture of the master node.

In a preferred embodiment, the master node consists of an off-chip I/O interface (modrxoff, modtxoff), an on-chip I/O interface (modrxon, modtxon), and a bridge module (modbridge) (FIG. 5).

A functional description is now given. The I/O interfaces make abstraction of the physical communication interface. The blocks can be transparent since a serial 1-bit protocol and digital CMOS levels are used. Alternatively, these blocks could contain the differential and low-voltage/CMOS-level conversion functionality. The bridge may perform the following functions.

Serial read and interpretation of the packet structure including Wait for trailing sync bit, Retrieve slow/fast flag, Retrieve read/write flag, Retrieve address (serial-to-parallel conversion), Retrieve payload (serial-to-parallel-conversion).

Propagation of the incoming off-chip packet to the on-chip side which includes transparent propagation and appending additional clock cycles (NumAddClk).

Propagation of the incoming on-chip packet (through the loop back) to the off-chip side.

Address matching for its own addresses (see recognised addresses) which includes address matching and storage of received parameters.

Some control issues are now discussed. The master is also the entry point for any externally-provided clock and reset signals. In a specific implementation, three signals may be provided through the off-chip interface: a chip enable (NocCE), a clock signal (NocCLK), and an asynchronous reset signal (NocRST). Regarding recognised addresses, the following is to be noted. The amount of additional clock cycles that are appended to a packet to compensate for the on-chip clock propagation delays, is made programmable. The master node recognises a specific address (1000 0000) through which the number of additional clock cycles (NumAddClk) can be programmed.

Architecture of a Slave Node

Figure 6:
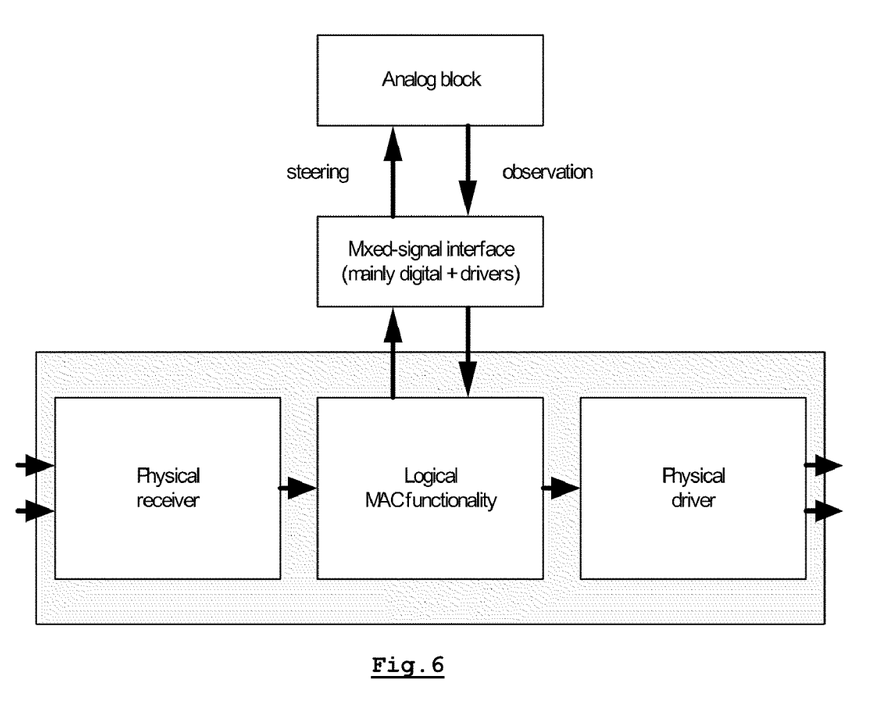
FIG. 6 illustrates an architecture of the slave node.

In a preferred embodiment, a slave node consists of an input interface (modrx), an output interface (modtx), MAC functionality (modmac), and the specific functionality that connects to the analogue block (modbitdec, modbufstg) as illustrated in FIG. 6.

Concerning the functional description it is noted that the I/O blocks have the same functionality as for the on-chip interface (modrxon, modtxon) of the master node. The MAC block performs the same packet identification and propagation functionality as in the master node. Retrieved flag, address and payload information is passed to the bit decoder (modbitdec). The bit decoder performs the address matching with a set of programmed addresses and performs the mapping of bits in the payload to analogue control pins. It also includes the storage register file for holding all initial values at reset and the current values. The buffer stage performs the buffering of the register file outputs to the individual digital control pins that are routed towards the analogue blocks.

Detailed View on the Node Interface

Extending this initial view, a specific mixed-signal interface can be added between the digital and the analogue block. Furthermore, one can refer to modrx and modtx as physical receivers and physical drivers in general. This means that these blocks can also incorporate signal format conversions to adapt from e.g. CMOS logic voltage levels to other appropriate signalling formats for the interconnect (e.g. LVDS).

Logical MAC Functionality

The logical media access control (MAC) functionality can be implemented in plain digital CMOS. This part has two functions in combination with a logical packet-based communication scheme, which transports information on the network segment:

(a) receive: Its function is to identify packets that are intended for a specific node. In this case, the packet information is retrieved and communicated to the mixed-signal interface. If the address matches the node address, information is taken from the packet and processed. If the address does not match, the packet is propagated to the physical send part, such that it travels to the next node. If a packet sent by the bridge returns to the bridge unchanged, it means that no node reacted on the packet. The bridge then knows that the packet has not been processed correctly by a node and it can e.g. signal an error or retry the transmission. Packets sent by the bridge that reach the bridge or that have the bridge as a receiver address, are taken off the ring.

(b) transmit: Two modes are described here. If the node has a permanent clock, it can trigger transmissions itself. In this case, it monitors the activity on the physical receive end. If no activity is found, it can create a packet itself and place it on the physical transmit end. If the node is not self-clocked, it uses a clock provided by the physical receive end. In this case, it is the responsibility of the on-chip bridge to create specific packets that trigger the MAC in a particular node to send information. In this case, the MAC derives the address from the incoming packet, and if it matches the node address, the packet is withheld and not passed on further. Instead, a new packet is constructed, local node information obtained from e.g. the analogue block is placed in this packet and the packet is sent on the transmit end. Note that, in this case, the target address of this packet is usually the bridge. The bridge is then able to receive this information (since a closed ring is used).

EXAMPLE

Figure 7:
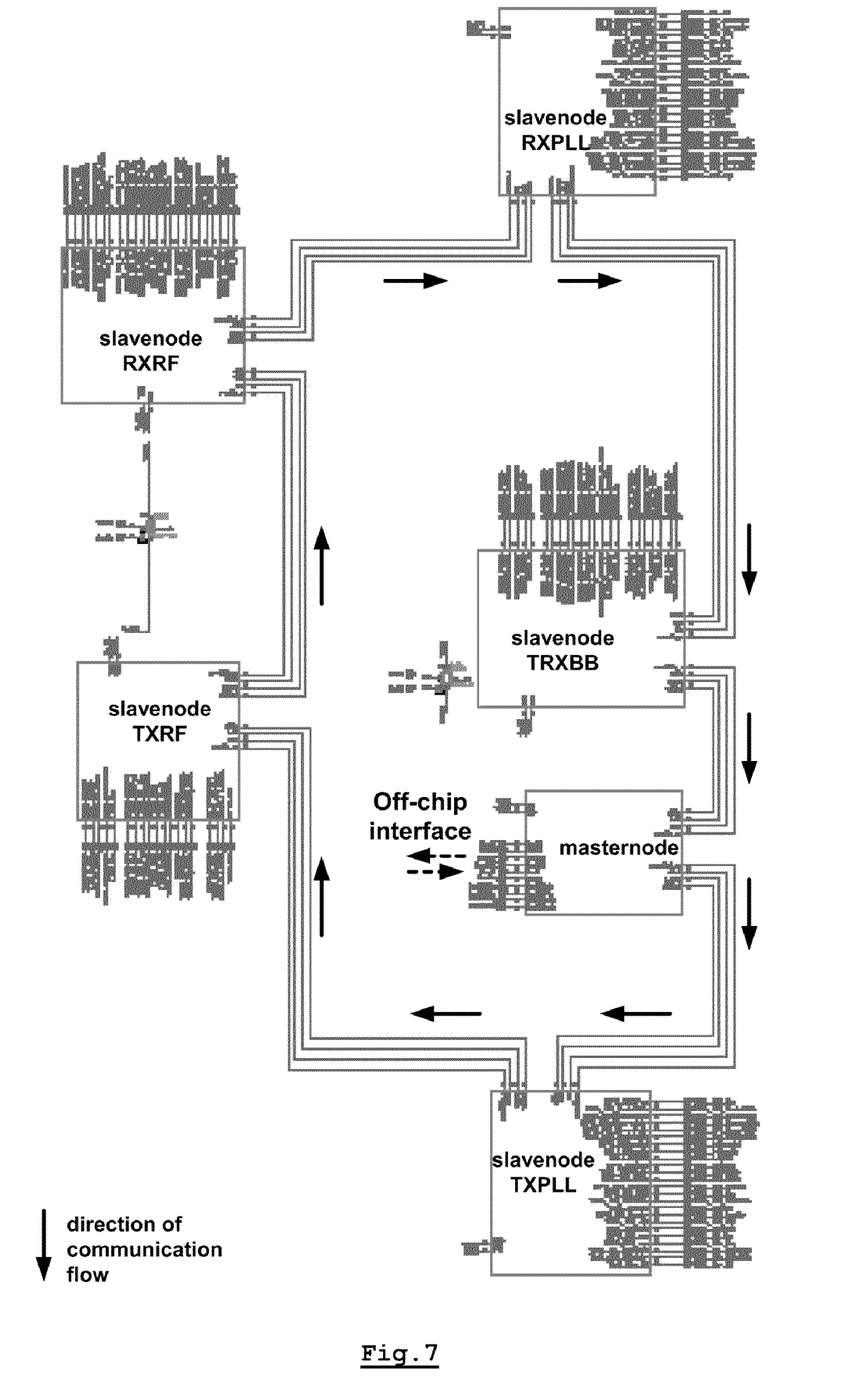
FIG. 7 illustrates an example instantiation of a control network.

As an example one can consider a network with one network segment on-chip and one network segment off-chip (FIG. 7). Both segments are connected through the master node, which acts as a bridge. The on-chip segment contains the master node and 5 slave nodes. The off-chip segment contains at least the master node and a programming node.
Logical Packet-Based Communication Scheme
A serial communication scheme defines a packet structure to sequentialise all information, covering both synchronisation, control, and data payload information.
Data Communication: bit-serial (1-bit) communication is assumed between the nodes. Each node has 1-bit input and 1-bit output ports.
Signalling and synchronisation between slave nodes and master node (bridge): Clock signals can be propagated together with the packets on the communication bus. In this case, modules can work without a clock, but use a phase-locked loop (PLL). In this case, each node uses a small digital PLL to recover the clock information from e.g. Manchester-coded digital signalling. Two issues should be considered. Firstly, in order to propagate a constant clock to all modules, this clock can be enabled/disabled centrally and allows a clock gating operation. Secondly, relying on the fact that modules do not operate if there is no activity on the ring. All clock pulses are provided by the master in this case (the bridge). Also clock pulses for e.g. delayed processing in the node are originated from the bus. The bridge increases the amount of clock pulses to cover all processing needs in the complete ring.
Support for Multiple Packet Types
Since delay and throughput requirements vary, it is desirable to have slow and fast packet types. Fast adaptation of parameters can be required, such as when the gain settings are adapted for automatic gain control. Similarly, it is desirable to set all parameter bits at the same time for a particular parameter. That is, the length of the packet payload should be determined by the maximum length of a parameter (e.g. PLL programming parameters with 15 or 16 bits). On the other hand, not all parameters require fast programming or such long word lengths. Hence, one can opt for a scheme with two types of packets, namely slow (S) packets for simple control or short control words and fast (F) packets for complete control words. The choice for two packet types reduces in general energy consumption and activity on the bus. This scheme can be extended to more and different combinations of packet types depending on the usage patterns and the actual design constraints. It is assumed that the clock is passed through the ring. Hence, each node has one clock input and one clock output. The clock is propagated. For resetting all nodes to a known state, an asynchronous reset is assumed. The reset is also propagated through all nodes. Each node has one reset input and one reset output.
Positive Consequences for the Routing and the Design Cost for Routing
The consequent use of propagation for data, synchronisation, and control information allows the usage of routing channels between the nodes. Each node has 3 input pins and 3 output pins for data, clock, and reset, respectively. The usage of routing channels greatly simplifies the effort of routing. It is to be noted that these channels do not need to be adapted even if the number of bits to control per node, control frequency, or the number of nodes change.
Example for the Packet Structure
A packet consists of synchronisation, control, and payload information:

| Sync | S/F packet indication | R/W flag | MAC address | Payload information | Additional clock pulses |

For each field in the packet, function and size are defined in the following Table 1.

TABLE 1

| | Size | Value |
|---|---|---|
| Sync | 1 bit | Always '1' |
| S/F packet indication | 1 bit | '1' = slow '0' = fast |
| R/W flag | 1 bit | '0' = read '1' = write |
| MAC address | 4 bit (fast packet) 8 bit (slow packet) | |
| Payload information | 24 bit (fast packet) 12 bit (slow packet) | |
| Additional clock pulses | Programmable from 0 to 41 | Always '0' |

Table 2 then shows the sizes and time duration thus obtained for a single packet in slow and fast version.

TABLE 2

| Packet type | Total packet length in bits (15 additional clock cycles) | Time duration for 120-MHz clock (in µs) |
|---|---|---|
| Slow | 3 + 8 + 12 + 15 = 38 | 3.17 |
| Fast | 3 + 4 + 24 + 15 = 46 | 3.83 |

Determining the amount of sufficient additional clock pulses: The number of required additional clock pulses depends on the amount of nodes in the segment and the delay per node. The delay per node is the processing delay introduced between the input stage and the output stage of the node. A typical value for this delay is 3 clock cycles. The number of slave nodes is 5. Hence, at least 5×3=15 clock cycles are appended by the master node to guarantee that all slave nodes receive enough clock cycles for proper operation.

Two solutions can be envisaged for clock propagation along the network path. The first one has been previously described. A second one balances the clock propagation delay and the data propagation delay in each node. In the first solution, the clock activity profile over time ramps up in a triangular shape creating an integrated noise energy proportional to N×N/2×(propagation delay per node)×noise density with N nodes. Depending on the propagation delay and the number of nodes, noise energy density peaks can amount up to N×noise density. The second solution reduces the integrated noise energy to N×(propagation delay per node)×noise density. A reduction of the overall noise energy per packet transmission can result in less interference with the operation of the analogue/RF circuitry and hence result in better performance.

A variation of the previous solution for the local storage of a single configuration in each node in the writing mode is its extension to store at least 2 such configurations. This allows programming at non-critical times (e.g. at idle time and not during the operation of the analogue/RF circuitry) and activation of one of the configurations through a simple command instruction (e.g. a short packet) that does not contain all individual configuration bits. This solution calls for a duplication of the configuration registers in each node (cfr. modbufstg) and either a dedicated packet instruction for activation per node or for groups of nodes or for all nodes together or the usage of a dedicated activation line which is routed together with the clock and data signal path from node to node. The dedicated activation line results in a very fast, parallel activation in all nodes since this operation can be performed at the buffer stage (modbufstg) without the need for clock support (hence, propagation delay through the network is completely eliminated).

Combinations of both techniques (one activation line and dedicated activation packets) are particularly interesting.

Fail-safe operation of the control network can be guaranteed by routing the digital supply voltage together with the signal, clock, reset, and activation line (optional) signal in the existing routing channels. Ground signals from the shielding of these channels can be optionally reused; otherwise, a dedicated ground signal should be routed in parallel with the supply voltage signal. This supply voltage feeds all digital logic in the nodes. The low power requirements for the operation of the control network allow the usage of a single supply pair at one entry point in the control network. The supply and ground voltage paths can be closed or not (in the circular topology). This technique can improve fail-safe operation compared to the classical approach where each node would be supplied through a pair of pads closest to the chip boundary and eventually even shared with the adjacent digital supply for an analogue/mixed-signal block. Even when disabling intentionally the supply for the analogue/mixed-signal block (e.g. to save energy) or in case of a malfunctioning of the analogue/mixed-signal block (short-circuit, voltage drop due to high load, overheating, etc.), the control network remains fully operational.

The invention claimed is:

1. A front-end system for a communication system comprising:
   a plurality of analogue blocks arranged for transmitting and receiving analogue signals; and
   a digital unidirectional circular network operative for controlling and monitoring the operation of at least one analogue block of the plurality of analogue blocks, the digital unidirectional circular network arranged for implementing a logical packet-based communication scheme, the digital unidirectional circular network comprising:
      a digital master node configured to send a data packet; and
      a plurality of digital slave nodes, wherein each slave node is connected to one analogue block of the plurality of analogue blocks, each slave node comprising interface circuitry for controlling and monitoring the connected analogue block and at least a first configuration register, and each of the digital slave nodes being configured to:
         receive a first data packet from the digital master node, the first data packet comprising a first configuration;
         store the first configuration in the first configuration register;
         after storing the first configuration, receive an activation command from digital unidirectional circular network;
         identify whether the activation command is addressed to the digital slave node;
         in response to identifying that the activation command is addressed to the digital slave node,
            retrieve the first configuration from the first configuration register, and
            configure the connected analogue block using the first configuration,
   wherein parameters for communication over the digital unidirectional circular network are selected to substantially minimize interference among the plurality of the analogue blocks by balancing clock propagation delay and data propagation delay in each node of the plurality of digital slave nodes by use of a clock activity profile that ramps up over time determined by the sequential activation order for the analogue blocks as required for a particular system functionality.

2. A system according to claim 1, wherein at least two analogue blocks of the plurality of analogue blocks are on a single chip.

3. A system according to claim 1, wherein the digital unidirectional circular network is implemented in a single integrated circuit.

4. A system according to claim 1, wherein the digital unidirectional circular network is implemented in a single package.

5. A system according to claim 1, wherein each of the plurality of digital slave nodes comprises a media access layer (MAC) block.

6. A system according to claim 1, wherein the parameters for communication are selected from a group of parameters consisting of frequency, signal amplitude, packet length, and packet format.

7. A system according to claim 1, wherein the digital master node is a component of a baseband processor.

8. A system according to claim 7, wherein the digital unidirectional circular network and the baseband processor are in a single integrated circuit.

9. A system according to claim 7, wherein the digital unidirectional circular network and the baseband processor are implemented in the same package.

10. A system according to claim 1, wherein the digital master node is provided with a Quality of Experience manager.

11. A system according to claim 1, wherein at least two digital slave nodes of the plurality of the digital slave nodes are configured for differential signaling.

12. A system according to claim 11, wherein the at least two digital slave nodes are configured for include low voltage differential signaling.

13. A system according to claim 1, wherein at least two digital slave nodes of the plurality of the digital slave nodes are configured for one-bit communication.

14. A system according to claim 1, wherein the digital master node is operative to adapt the length of the data packet to at least two speeds of communication.

15. A system comprising a first front-end system as recited in claim 1, a second front-end system as recited in claim 1, and a bridge node for connecting the first and second front-end systems.

16. The system according to claim 1, wherein the digital master node is further configured to perform packet identification and propagation.

17. The method of claim 1, wherein receiving the activation command comprises receiving the activation command via a data packet comprising the activation command.

18. The method of claim 1, wherein the digital unidirectional circular network comprises an activation line, and wherein receiving the activation command comprises receiving the activation command via the activation line.

19. A method for controlling the operation of a front-end system, the method comprising:
   receiving a first data packet via a digital unidirectional circular network at a digital slave node, the data packet comprising a first configuration, wherein the digital slave node comprises at least a first configuration register, and wherein the digital slave node is connected to an analogue block from a plurality of analogue blocks;
   storing the first configuration in the first configuration register;
   after storing the first configuration, receiving an activation command at the digital slave node;
   identifying whether the activation command is addressed for the digital slave node;
   in response to identifying that the activation command is addressed for the digital slave node,
      retrieving the first configuration from the first configuration register, and
      configuring the connected analogue block using the first configuration,
wherein parameters for communication over the digital unidirectional circular network are selected to substantially minimize interference among the plurality of the analogue blocks by balancing clock propagation delay and data propagation delay in the digital slave node by use of a clock activity profile that ramps up over time determined by the sequential activation order for the analogue blocks as required for a particular system functionality.

20. A method according to claim 19, wherein the configuration information includes packet format information.

21. A method for monitoring the operation of a front-end system, the method comprising:
   transmitting, from a digital master node over a digital unidirectional circular network arranged for implementing a logical packet-based communication scheme to a digital slave node, a first configuration, wherein the first configuration specifies a configuration to be stored by the digital slave node; and
   after transmitting the first configuration, the digital master node transmitting an activation command to the digital slave node, the activation command configured to instruct the digital slave node to retrieve and utilize the first configuration,
wherein parameters for communication over the digital unidirectional circular network are selected to substantially minimize interference among a plurality of the analogue blocks by balancing clock propagation delay and data propagation delay in the digital slave node by use of a clock activity profile that ramps up over time determined by the sequential activation order for the analogue blocks as required for a particular system functionality.

22. A method according to claim 21, wherein the digital master node includes a Quality of Experience manager.

* * * * *